United States Patent [19]

Ferrighi

[11] 4,436,499
[45] Mar. 13, 1984

[54] HOUSEHOLD HAND-DEVICE FOR USE AS MEAT-PRESSER TO SHAPE MINCEMENT INTO STEAKS

[75] Inventor: Antonietta Ferrighi, Crusinallo, Italy

[73] Assignee: Acea Manodomestici S.r.l., Crusinallo, Italy

[21] Appl. No.: 398,961

[22] Filed: Jul. 16, 1982

[30] Foreign Application Priority Data

Jul. 20, 1981 [IT] Italy ................. 23027 A/81

[51] Int. Cl.³ ..................... A22C 7/00; B29C 1/00
[52] U.S. Cl. .............................. 425/195; 17/32
[58] Field of Search ........................ 17/32; 425/195

[56] References Cited

U.S. PATENT DOCUMENTS

| | | | |
|---|---|---|---|
| 1,069,509 | 8/1913 | Winn | 17/32 |
| 1,690,526 | 11/1928 | Bilodeau | 17/32 |
| 1,808,993 | 6/1931 | Murray | 17/32 |
| 1,892,779 | 1/1933 | Cole | 17/32 |
| 2,207,545 | 7/1940 | Kolas | 425/195 |
| 2,994,286 | 8/1961 | Mussari | 17/32 |
| 3,148,430 | 9/1964 | Hanner | 17/32 |
| 3,332,106 | 7/1967 | Zoehfeld | 17/32 |
| 3,411,176 | 11/1968 | Holly | 17/32 |
| 3,943,602 | 3/1976 | Siclari | 17/32 |
| 4,057,874 | 11/1977 | Walker | 17/32 |

FOREIGN PATENT DOCUMENTS 30726 2/1904 Switzerland ................. 17/32

Primary Examiner—Willard E. Hoag
Attorney, Agent, or Firm—Allison C. Collard; Thomas M. Galgano

[57] ABSTRACT

A household hand-device for use as a meat-presser is described in which the container member of the device forms the base of a cylindrical body which slidingly receives therein a handle member that is also cylindrical in shape and that cooperates with a return spring. By this mechanism, a plunger-type presser may be operated to displace it within a chamber in the container. A removable bottom of the container consists of a cup-shaped member, which can be fitted over the external wall of said container to cause the cup member to get firmly engaged with a central body through a number of bayonet joints.

7 Claims, 6 Drawing Figures

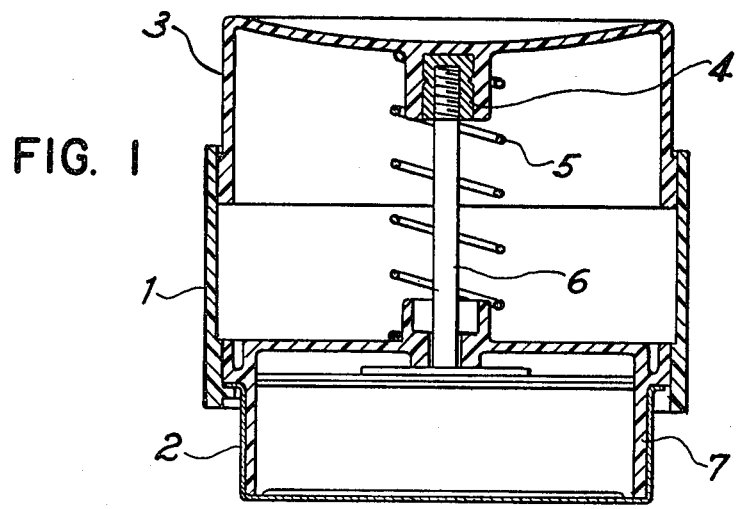
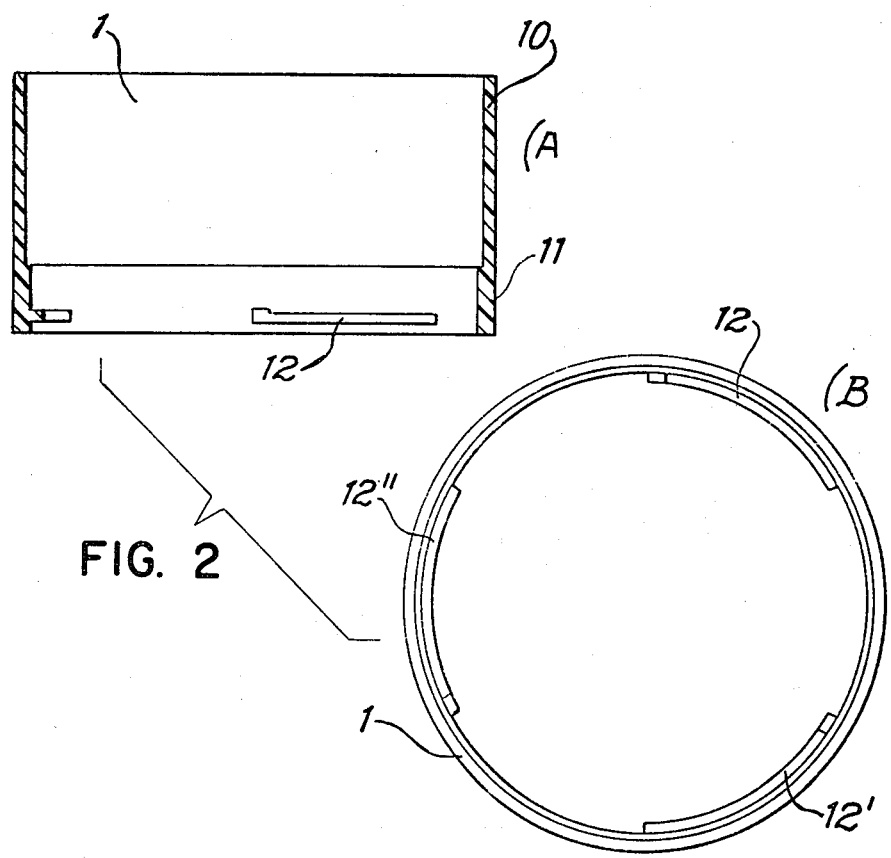

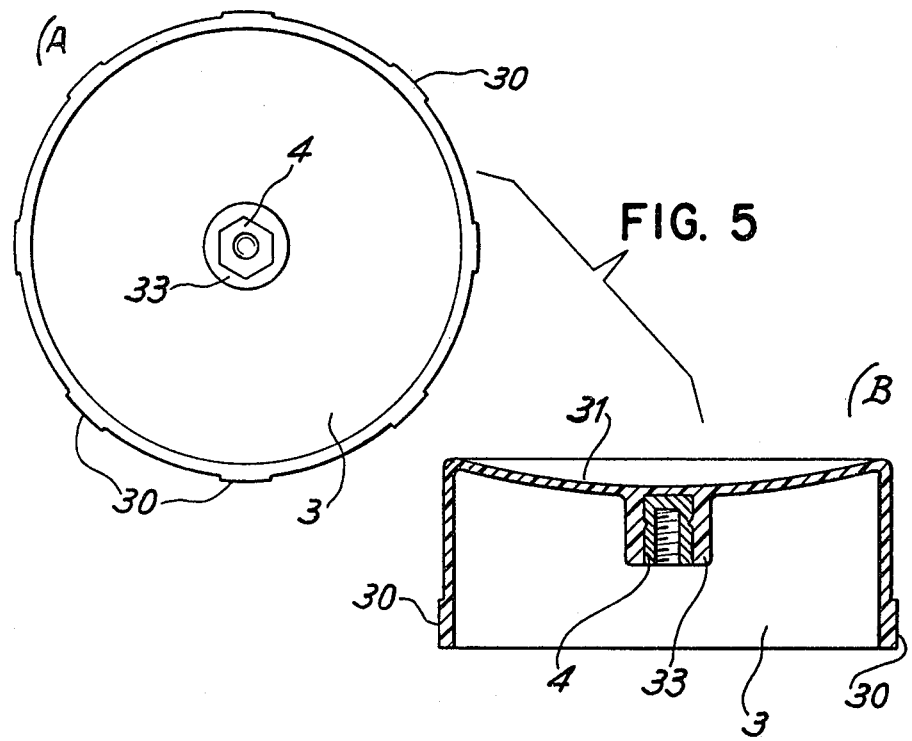
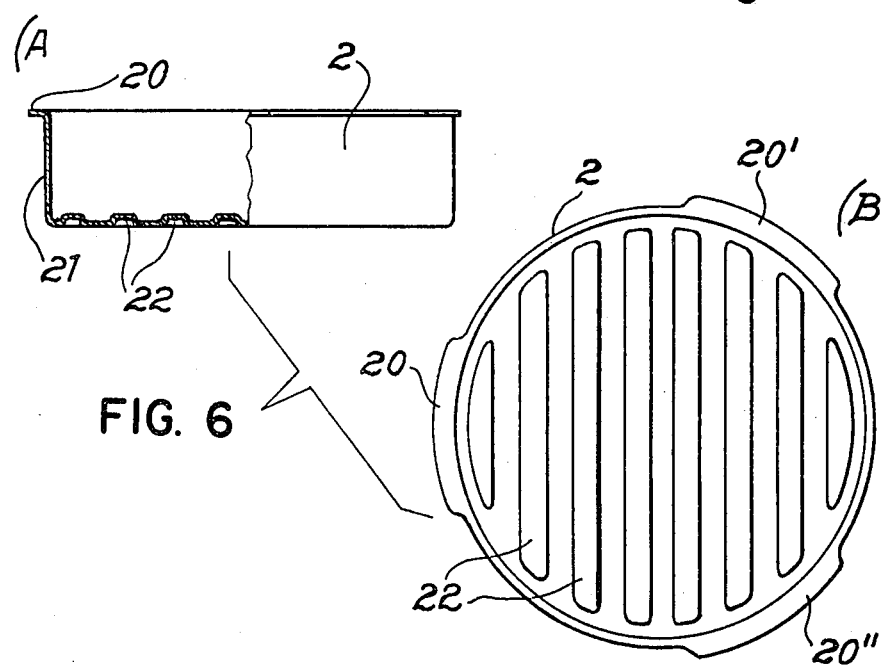

HOUSEHOLD HAND-DEVICE FOR USE AS MEAT-PRESSER TO SHAPE MINCEMENT INTO STEAKS

It is a usual practice to form steaks from previously minced meat, which permits to achieve rupturing of the protein fibrils in the meat, and to have lean meat, fats and spices evenly and intimately mixed together so as to give a more tasty and digestible product. However, in order that all of these beneficial effects may be fully attained it is necessary for the treated meat to become evenly distributed without any void spaces left therein, and to be subjected to a pressing action exerted in an identical manner, and in all points, on it. Moreover, it is noted that the shape into which the mincemeat is pressed has to be a solid and well packed shape with no sharp edges, the most preferred and simple shape being the cylindrical shape with a circular base.

The present invention permits all of these objects to be attained by utilizing means which are simple and easy to handle and to maintain.

In order that the operation of the device, and the way to individually achieve the objects of the invention, may be better understood, the following description is given with reference to the accompanying drawings, in which:

FIG. 1 is a vertical sectional view taken through the mincemeat pressing device as a whole;

FIG. 2 shows the central, annular guiding member;

FIG. 5 is a detail view showing the sliding-rotatable handle member; and

FIG. 6 shows the cup-shaped member having parallel ribs formed on the bottom thereof.

Figure 3:
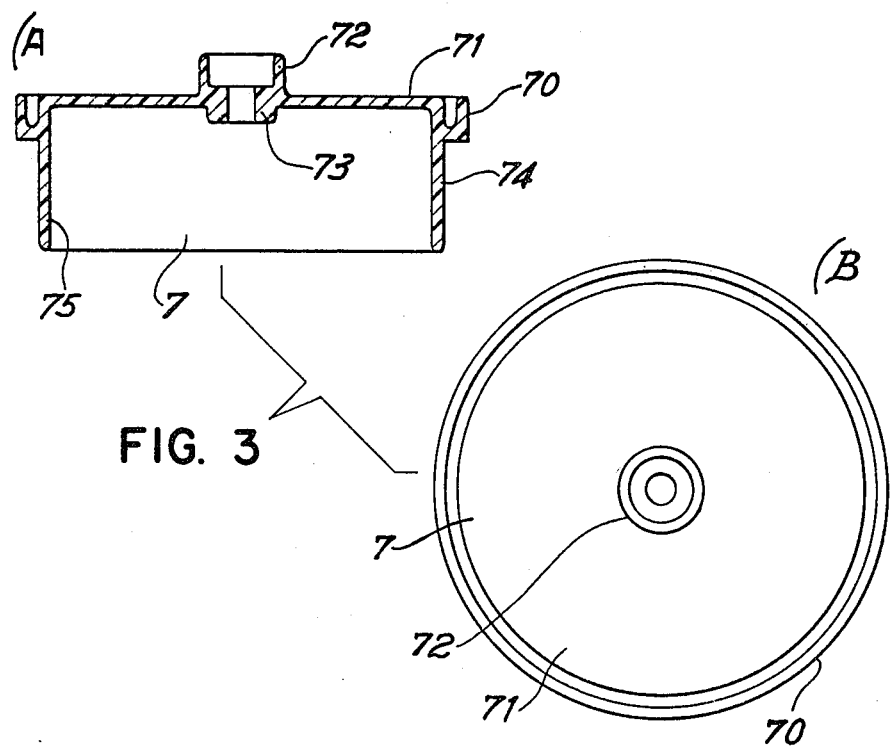
FIG. 3 shows the base container member.
Figure 4:
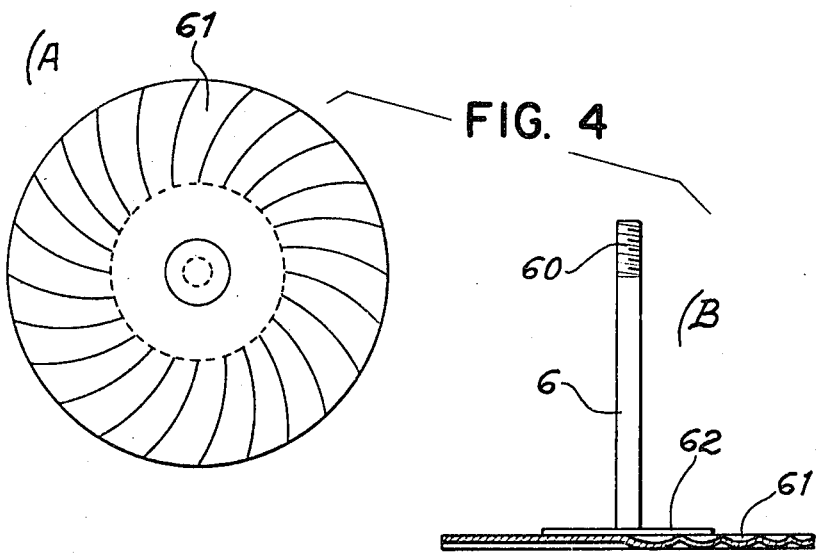
FIG. 4 shows the pressing member with helical ripples; formed thereon.

The device includes a central annular member or cylindrical body 1 which is molded from a colored plastic material, and the inside walls 10 and 11 of which have, at 11, a portion of slightly reduced diameter that is designed for receiving and then retaining by shrink fit the external walls 70 of the base container 7. The cylindrical portion 11 also has integrally molded thereon three projections 12, 12' and 12" which are to receive therebetween the wing-segments 20, 20' and 20" of a cup-member 2 whereby this latter is locked in place on said projections.

The container body 7 is molded from a plastic material suitable for food uses, preferably white in color, and is provided, as already mentioned above, with an external annular surface or flange 70 which—with the parts being at the same temperature—affords a loose interference fit with the receiving wall portion 11 of the central section 1.

When said central section 1 is brought to a higher temperature, it can receive in its opening 11 the circular flange 70 whereupon, on cooling, a fixed locking together of the parts is obtained by shrink fit.

The base, annular container 7 has an upper-bottom portion 71 which is provided at its center with an annular formation 72, that is to serve as a stop means for a spring 5, and a hole 73 for slidingly receiving therethrough the stem portion of the presser member 6. Moreover, the external wall 74 of the annular container 7 is of such calibrated outside diameter and height as to be able to receive over it the wall 21 of the cup member 2 and to thus allow the wing-segments 20, 20' and 20" of this latter to insert between, and be rotatably located on, the projections 12, 12' and 12" of the central body 1.

The presser member 6 includes a central stem portion 60 which is threaded at its top end, while the lower end of said stem portion is sealed to a disk 62 that is integral with the pressing disk 61, this latter being formed, by molding, with shallow, helically extending ridges or ripples which are able to impart to the mincemeat a rotational movement to a slight extent.

Said presser member 6, of which the helically rippled disk 61 is of such a diameter as to be in a slight sliding contact with the internal wall 75 of the container body 7, is passed by its stem portion through the guiding hole 73 to be received in the interior of the spring 5, which latter is in turn centered on the annular spring locating stop 72.

Finally, the shank 60 of the presser member 6 is engaged by its threaded end in an internally threaded brass bush 4 and screwingly coupled therewith, said bush 4 being incorporated within a boss 33 that is integrally molded with the cylindrical body of the handle member 3. This body is of cylindrical construction with a top or head having a convex, substantially hemispherical, rough-finished surface 31 upon which the user is able to exert action by one's hand. The outer side wall of the body 3 is slightly smaller in diameter than the inner diameter of the body 1 and is provided with a number of slightly jutting out projections 30 in the form of cylindrical segments of small height, in order to ensure an easy and proper sliding movement of the two parts with respect to one another, with possibility for relative rotation thereof when the spring 5, which is abutting against the annular projection 72, at its lower end, and the boss 33 at its upper end, is alternatively compressed and released by the user acting by one's hand upon said convex surface.

The operation of the household hand-device as described so far is as follows.

When the spring 5 is released, the presser member 6 is brought to a position adjacent the head or upper-bottom 71 of container 7. Then, the device may be turned upside down and the mincemeat charged in the chamber of the container 7 from which the cup-shaped member 2 has been previously removed. Once the desired amount of mincemeat is charged and roughly distributed, the cup member 2, of which the bottom is provided with deep-drawn parallel ridges or ribs 22, is put on the container and moved thereover until the segments 20, 20' and 20", formed on said cup member, are fitted between the projections 12, 12' and 12". A clockwise rotation of about 30° will then cause the cup member 2 to be clamped in place there.

Now, with the device having been returned to its normal position, a number of pressure-rotation impulses are applied by hand on the handle member. Due to the helically ribbed configuration of, and the rotation imparted to, the presser member, there is a tendency for the mincemeat to be well distributed, while at the same time the cup member, thanks to the existence of the parallel ridges on its bottom portion, prevents the mincemeat from being simultaneously dragged along, which would hinder both the effects of side expansion and simultaneous axial pressure evenly exerted thereon.

After a number of the above described actions, accompanied by optional pressure, have been repeatedly accomplished, an evenly and well calibrated mincemeat-steak is obtained and is ready for use. In order to have it taken out, with the device having been turned again upside down, the cup member is caused to rotate counterclockwise whereby the so disengaged cup member can be taken off. Then, applying a pressure on the handle member causes the presser member to act as a knockout or extractor which permits the mincemeat-steak to be delivered free at the opening of the container 7.

For cleaning purposes, it may be sufficient to have the device brought in the above steak-taking-out position. However, if a more thorough cleaning operation is desirable, then, the presser member 6 may be disconnected by screwing it off the handle member 3, the two parts being only locked together by the threaded bushing 4 fitted on the shank 60.

Modifications as to the dimensions or the configuration details of the device, are possible and fall within the scope of this invention.

What we claim is:

1. A hand operable device for use as a household meat presser, said device having a cylindrical central body within which a cylindrical handle member is slideably received, said handle member having a spring return means, a container member connected with said central body and having therein a plunger pressing means moveable by said handle and a cup member removeably connected with said central body and forming a bottom closure for said container member.

2. The device according to claim 1, wherein said cup member is removeably connected to said central body by a bayonet-type catch means.

3. The device according to claim 1, wherein said container member is made from a resin suitable for use in food processing equipment and is tightly coupled to said central body by a shrunk-fit.

4. The device according to claim 1, wherein said plunger pressing means is provided with helically extending moldings at least on a meat-contacting side thereof.

5. The device according to claim 1 wherein said cup member has its bottom provided with parallel ribs.

6. The device according to claim 1 wherein said plunger pressing means is threadably releasably secured to said handle member, the two members being only locked together by means of the threaded bushing fitted over the shank.

7. The device according to claim 6, wherein said plunger means is secured to said handle member by said plunger pressing means having a shank with a threaded end and said handle member having a threaded bushing in which said threaded end is received.

* * * * *